United States Patent
Hutchon et al.

(10) Patent No.: US 8,477,446 B2
(45) Date of Patent: *Jul. 2, 2013

(54) WRITING DATA TO A TAPE

(75) Inventors: Neil Thomas Hutchon, Bristol (GB); Jonathan Peter Buckingham, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 359 days.

This patent is subject to a terminal disclaimer.

(21) Appl. No.: 12/984,474

(22) Filed: Jan. 4, 2011

(65) Prior Publication Data

US 2012/0170147 A1 Jul. 5, 2012

(51) Int. Cl.
*G11B 5/09* (2006.01)
*G11B 27/36* (2006.01)

(52) U.S. Cl.
USPC .................................. 360/53; 360/31; 360/48

(58) Field of Classification Search
None
See application file for complete search history.

(56) References Cited

U.S. PATENT DOCUMENTS

| | | | | |
|---|---|---|---|---|
| 7,127,554 B2* | 10/2006 | Buckingham | .................. | 711/111 |
| 7,814,395 B2* | 10/2010 | Monen et al. | .................. | 714/763 |
| 8,331,052 B2* | 12/2012 | Buckingham et al. | .......... | 360/53 |

* cited by examiner

*Primary Examiner* — Regina N Holder
(74) *Attorney, Agent, or Firm* — Steven L. Webb

(57) ABSTRACT

A method and apparatus for writing data to a tape is disclosed. A plurality of data segments are written onto a tape simultaneously. Any data segments written to the tape that needs to be rewritten are identified. Each data segment that needs to be re-written is accumulated. The accumulated data segments are written to tape when a full set of data segments have been accumulated. The re-written data segments each have a first field in a header that designates itself and a second field in the header that designates a second re-written data segment.

15 Claims, 3 Drawing Sheets

WRITING DATA TO A TAPE

BACKGROUND

Tape drives typically store multiple tracks of data onto a tape simultaneously. For example, tape drive that use the linear tape open (LTO) specification may write 16 tracks of data onto the tape at the same time. Many tape drive are configured with read heads positioned adjacent to or behind the write heads. This allows the tape drive to read the data from the tape as it is being written onto the tape. This feature is typically called read-while-write. Using the read-while-write feature a tape drive can immediately detect errors written onto the tape.

When an error is detected using the read-while-write feature, the data can be re-written to a different location on the tape. Currently all 16 tracks of data are re-written onto the tape even when only one track of the original 16 tracks had errors.

DETAILED DESCRIPTION

Figure 1:
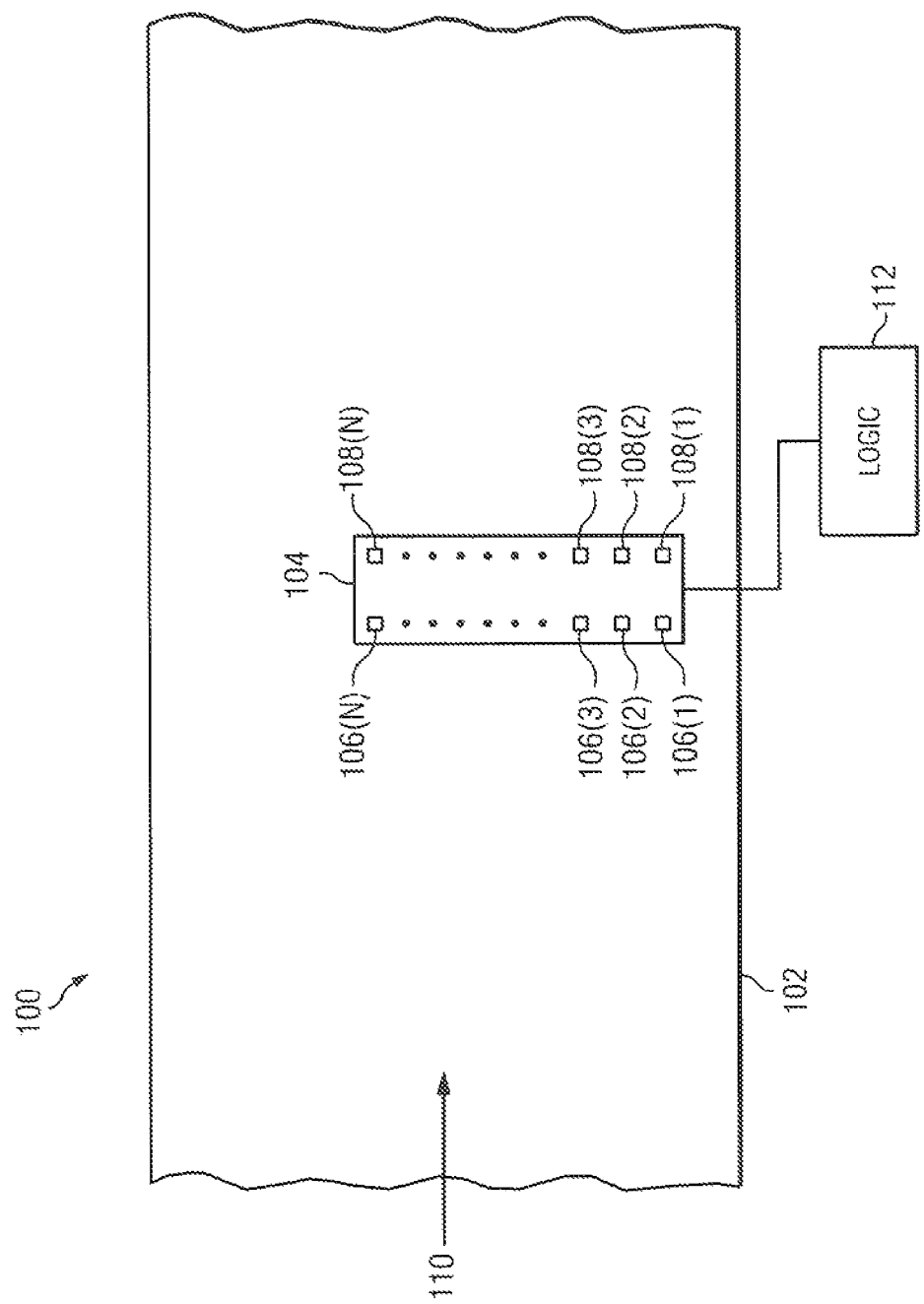
FIG. 1 shows a block diagram of a tape drive 100 in an example embodiment of the invention.
Figure 2A:
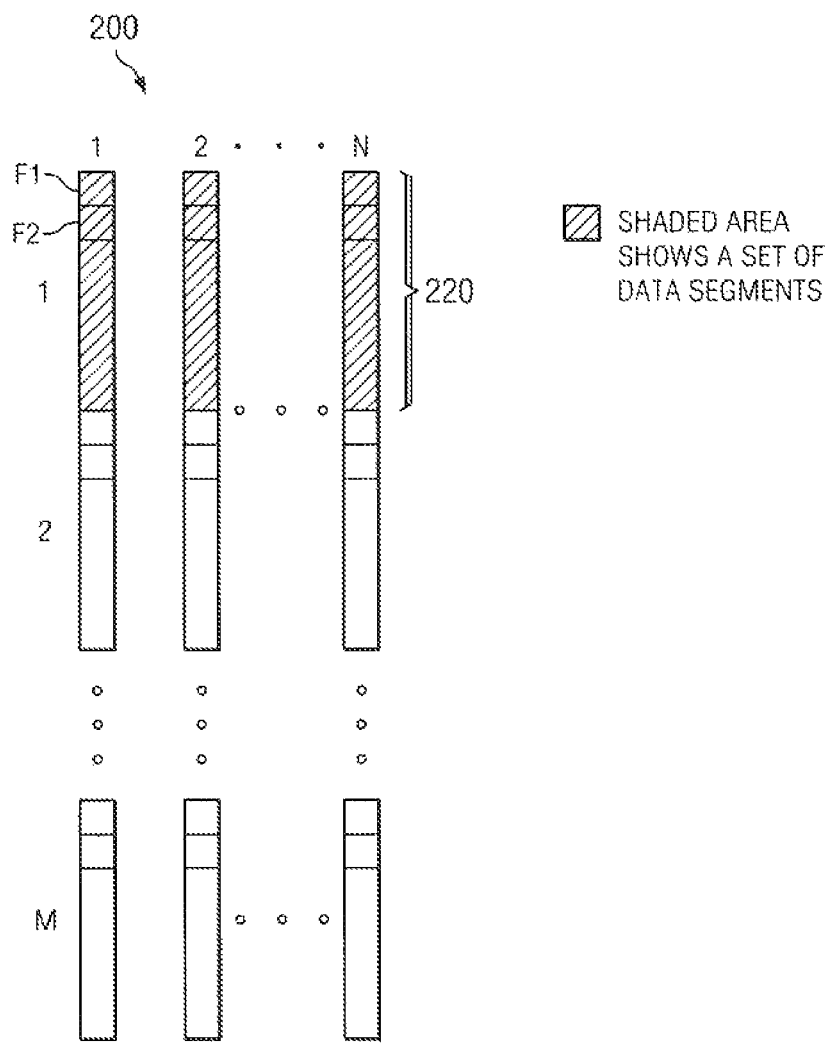
FIG. 2A is a block diagram of a dataset in an example embodiment of the invention.
Figure 2B:
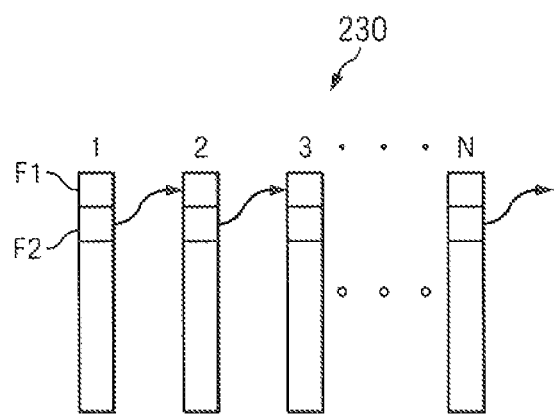
FIG. 2B is a block diagram of a set of data segments 230 that have been re-written to tape in an example embodiment of the invention.
Figure 3:
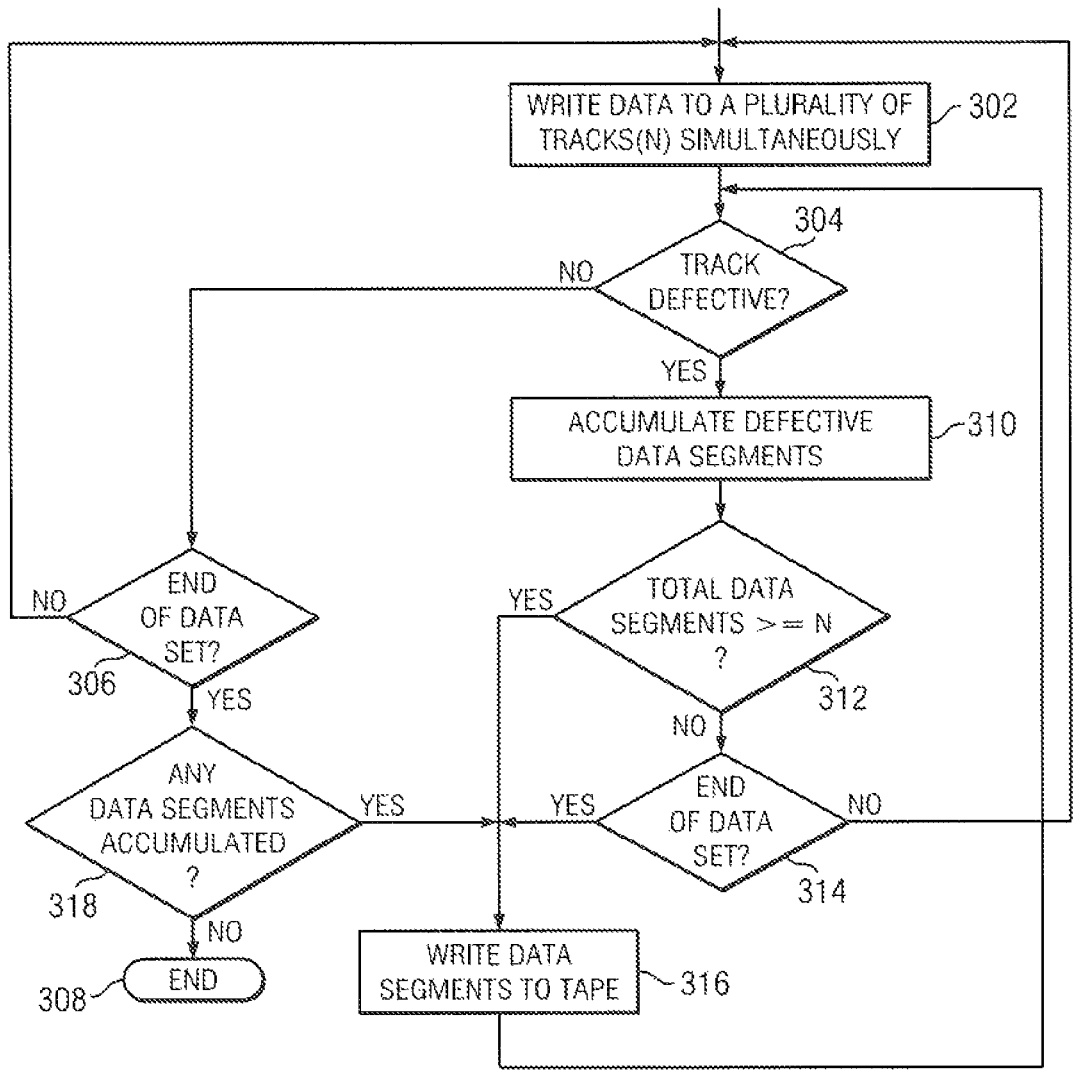
FIG. 3 is a flow chart for writing data to a tape in an example embodiment of the invention.

FIGS. 1-3, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In one example embodiment of the invention, a tape drive will write a set of data segments from a dataset onto the tape across a plurality of tracks simultaneously. Any data segment in the set of data segments containing an error will be identified using read-while-write. The data contained in the identified data segments will be accumulated until enough data segments are available to write a full set of data segments to the tape. For example, when 16 data segments are written to 16 tracks simultaneously, 16 data segments will be accumulated before the accumulated data segments are re-written back to tape. Each data segment re-written back to a track on the tape will contain a header. The header will contain at least two fields. The first field will identify the current data segment and the second field will identify another one of the data segments re-written back onto the tape. In one example embodiment of the invention, the other data segment identified by the second field will be the data segment written to an adjacent track.

FIG. 1 shows a block diagram of a tape drive 100 in an example embodiment of the invention. Tape drive 100 comprises a tape 102, a tape read/write head 104 and logic 112. Tape 102 moves in the direction of arrow 110. Read/write head 104 comprises a plurality of write heads 106(1)-106(n) and a plurality of read heads 108(1)-108(N). The plurality of read heads 108(1)-108(N) are positioned adjacent the plurality of write heads 106(1)-106(n) to enable read-while-write functionality. Read/write head 104 can be positioned in multiple locations across the width of tape 102. In some example embodiment of the invention, the functionality of the read heads 108(1)-108(N) and write heads 106(1)-106(n) may be swapped when the tape 102 switches directions. Logic 112 is coupled to tape read/write head and is configured to monitor and control the data being written by read/write head 104. Logic 112 may comprise a processor, memory, an application specific integrated circuit (ASIC), a combination of processors, memory and ASICs, or the like.

In operation, tape drive 100 writes N number of data tracks onto tape 102 simultaneously, where N is a positive integer greater than one. Typically, N is an even number, for example 8 or 16. In some instances N may be an odd number, for example 9. Tape drive 100 writes data onto the tape in minimum sized chucks of data called a datasets.

FIG. 2A is a block diagram of a dataset in an example embodiment of the invention. The data in a dataset 200 is written onto the tape in a plurality of N tracks simultaneously. The data written onto each track is also divided up into a plurality of data segments 1-M. Section 220 is the first data segment for track N in dataset 200. Each track will contain M data segments. A "set of data segments" is a collection of segments written simultaneously across all N tracks. For example, data segment 220 from each of the plurality of track N makes up a full set of data segments (as shown by the shaded area). A full dataset has M sets of data segments where each set of data segments is N tracks wide.

Each data segment in dataset 200 has a header that contains a field F1 that uniquely identifies the data segment within the plurality of data segments contained in a dataset. Field F1 may be called a descriptor. When the header for a data segment is defective, the data segment can be identified using the information from another header in the set of data segments that are written to the tape simultaneously. This is called cross channel interpolation. Cross channel interpolation is an error correction technique that uses the data and location of two or more data segments to re-create data lost to errors. In examples of this invention, the information extracted from one segment header can be used to compensate for an error in the header of another segment. FIG. 2B is instructive, it shows that each segment header describes itself and another segment. Each header contains a descriptor F1, which is an index allowing the data to be organised/interpreted correctly. Without this descriptor the data is unusable. Header interpolation allows a corrupt descriptor to be replaced by a valid descriptor from another header. In some example embodiments of the invention, the field F1 comprises 12 bits, allowing the identification of 4,096 unique data segments within a dataset. In some tape formats, for example LTO5/6, a dataset may contain only 3072 data segments within a dataset.

In the LTO format a data segment is called a code word interleaved (CWI) and a set of data segments is called a CWI set. When writing a dataset onto the tape 102, tape drive will write M sets of data segments onto tape, one set of data segments after another. When a set of data segments is being written onto the tape, tape drive uses read heads 108(1)-108(N) to confirm that the data was written correctly. When one or more data segments in the set of data segments are defective, the defective data segments will be re-written to the tape as discussed below.

When tape drive 100 is writing a set of data segments (or a CWI set) containing N data tracks onto the tape simultaneously, tape drive will use read heads 108(1)-108(N) to verify the data written onto the tape 102. When tape drive 100 determines that one or more data segments are defective, tape drive identifies and accumulates the data segments that were defective. Tape drive 100 will wait until one of two conditions occur before re-writing the accumulated data segments onto the tape. The first condition is when enough data segments have been accumulated to make a full set of data segments. For example, when the total number of tracks written simultaneously is equal to 16 (i.e. N=16) then when 16 data segments have been identified as being defective, all 16 of the accumulated data segments will be written to tape simultaneously. By waiting until there are a total of 16 data segments to be written back to the tape, the re-write efficiency may be increase by a factor of 16 relative to current implementations as described above.

The second condition that will trigger the tape drive to write the accumulated data segments to tape is when the end of the dataset is reached. Any data segments that have been identified as defective, and that have not already been re-written to tape, will be written to the tape as the last set of data segments in the dataset. Because the total number of tracks contained in the un-written data segments is less than the total number of tracks in a set of data segments, there will be unused tracks. The unused tracks can be left blank, can be padded with data, or may be used to duplicate une ur more of the current or former data segments.

When a set of data segments is re-written to tape, the header for each data segment in the set is modified to indicate that this is a re-written segment of data. Because the set of data segments being re-written to tape may contain the data segments from as many as N sets of data segments (or N CWI sets), cross channel interpolation may not be available to correct defective headers in the re-written data segments. In one example embodiment of the invention, a second field F2 will be written in the header of the re-written data segments. The second field F2 will be a copy of the first field F1 from an adjacent re-written data segment. In some example embodiment of the invention, an RF flag is set to indicate when a data segment has been re-written. When reading data, a set RF flag indicates that the current header interpolation must be used (i.e retrieving a copy of a damaged descriptor from the header in an adjacent track). When reading data, an unset RF flag indicates that this is a virgin data segment and other header interpolation methods may be used, for example cross channel interpolation.

FIG. 2B is a block diagram of a set of data segments 230 that have been re-written to tape in an example embodiment of the invention. The set of data segments 230 has N data segments. Each of the data segments in the set of data segments 230 has at least two fields in the header F1 and F2. The F1 field contains the unique identifier or designation for this data segment within the dataset. The field F2 contains a copy of the F1 field from the data segment that is written in the adjacent track. For example, the F2 field in data segment 2 contains a copy of the F1 field from data segment 3. The F2 field in data segment N will contain a copy of the F1 filed from data segment 1. By replicating the designation code of an adjacent data segment a linked list of data segments is formed.

In some example embodiments of the invention, the field F2 may contain the designation of a data segment that is not in an adjacent track. For example, the field F2 may contain the designation from a data segment two tracks away. In this way two separate linked lists of data segments are formed. The data segments in even numbered tracks will form one linked list and the data segments in odd numbered tracks will form a second separate linked list. Using this method, the information in a data segment may be re-created even when two adjacent tracks are corrupted. An additional field in the header may indicate how many tracks are skipped. For example, X=0 may indicate that the field F2 is copied from an adjacent track, X=1 may indicated that a track should be skipped before copying the field F2. The total number of linked lists may equal N/2.

When a set of data segments is originally written to tape, the second field P2 in the header of each data segment may be filled with a code that indicates that this is not a re-written data segment, for example all zeros. The F2 field may be set to another code when a full set of original data segments is re-written to tape using the "old" backwards compatible method, for example all ones.

The absolute track numbers used for a re-written data segment may be changed. For example, when a data segment was originally written to track one, the data segment may be re-written to track 5. In fact this rotation of segments onto a different track when rewritten is an advantage; consider the case where a track is always in error.

When a set of data segments (or a CWI set) is read from tape and none of the headers indicate re-written data, all the tracks in the set can be used for cross channel interpolation. In general, increasing the number of tracks available for cross channel interpolation of any given track increases the severity of errors that can be corrected; e.g. if the header information can be interpolated from any one of 4 tracks it is better than the situation where it can be interpolated from only one or two tracks.

FIG. 3 is a flow chart for a method of writing data to a tape in an example embodiment of the invention. At step 202, a plurality of data segments N are written to the tape onto N track simultaneously. At step 204 a check is made to determine if any of the data segments written in the previous step are defective. If there are no defective data segments, a check is made at step 206 to determine if the end of the dataset has been reached. If the end of the dataset has not been reached, flow returns to step 202. If the end of the dataset has been reached flow continues at step 218. At step 218 a check is made to determine if there are any accumulated data segments. If no data segments are accumulated flow stops at step 208. If there are data segments are accumulated, flow proceeds to step 216.

If it is determined that there are defective tracks at step 204 flow proceeds to step 210. At step 210 any data segments that are defective are identified and accumulated. At step 212 the total number of accumulated data segments is compared against the plurality of tracks N (i.e. checking for a full set of data segments). When the total number of accumulated data segments is equal to or greater than the plurality of track N, flow proceeds to step 216. At step 216 a full set of the accumulated data segments are written to tape. The header in each of the data segments will be re-written to tape with two fields, a first field containing the data segments designation and a second field containing the designation of a second data segment.

A full set of data segments contain the same number of data segments as the plurality of track N. For example, when the plurality of tracks N is equal to 8, there would be 8 data segments in a full set of data segments. All the data segments written to tape are cleared from the accumulated data segments. Any accumulated data segments beyond the full set of data segments are retained in the set of accumulated data segments. Flow then returns to step 204.

At step 212 when the total number of accumulated data segments is not equal to or greater than the plurality of track N, flow proceeds to step 214. At step 214 a check is made to determine if the end of the dataset has been reached. When the end of the dataset has not been reached, flow returns to step 202. If the end of the dataset has been reached, flow proceeds to step 216. At step 216 all the accumulated data segments are written to tape. The accumulated data segments written to tape will not be a full set of data segments. The unused tracks may be left blank, may be padded with data, or may be used to replicate one or more of the accumulated data segments. Flow then returns to step 204.

What is claimed is:

1. A method for writing data to a tape, comprising:
    writing data from a dataset onto the tape by simultaneously writing a plurality of data segments N onto the tape in N data tracks;
    determining if one or more of the plurality of data segments N written to the tape needs to be rewritten;
    accumulating each of the plurality of data segments for a rewrite when a data segment needs to be rewritten;
    when N data segments have been accumulated, simultaneously rewriting the N data segments to the tape and then deleting the rewritten data segments from the accumulated list, wherein each data segment in the N data segments rewritten to the tape has a first field in a header that designates itself and a second field in the header that designates a second re-written data segment;
    when the end of the dataset is reached, writing any remaining accumulated data segments to the tape, wherein each data segment rewritten to the tape has a first field in a header that designates itself and a second field in the header that designates a second rewritten data segment.

2. The method for writing data to a tape of claim 1, wherein the second rewritten data segment is in an adjacent track.

3. The method for writing data to a tape of claim 1, wherein the first and second fields contain 12 bits.

4. The method for writing data to a tape of claim 1, wherein an absolute track location for an accumulated data segment is changed when the data segment is re-written to tape.

5. The method for writing data to a tape of claim 1, wherein the header in each data segment re-written to tape is modified to indicate that this is a re-written data segment.

6. The method for writing data to a tape of claim 1, wherein read while write is used to determining if one or more of the plurality of data segments N written to the tape needs to be rewritten.

7. The method for writing data to a tape of claim 1, wherein the second field is written to a specific code to indicate when a data segment is originally written to tape.

8. The method for writing data to a tape of claim 1, wherein the second field is written to a specific code to indicate when a data segment is re-written to tape using a backwards compatible mode.

9. A tape drive, comprising:
    at least one tape read/write head, wherein the at least one read/write head is configured to write a plurality of data segments N onto a tape simultaneously;
    logic coupled to the read/write head and configured to determine when one or more of the plurality of data segments written to the tape needs to be rewritten;
    the logic configured to accumulate data segments that need to be rewritten, wherein the accumulated data segments are written to tape when N data segments have been accumulated, wherein each data segment rewritten to the tape has a first field in a header that designates itself and a second field in the header that designates a second re-written data segment.

10. The tape drive of claim 9, wherein the second re-written data segment is in an adjacent track.

11. The tape drive of claim 9, wherein an absolute track location for an accumulated data segment is changed when the data segment is re-written to tape.

12. The tape drive of claim 9, wherein a header in each data segment in the accumulated data segment re-written to tape is modified to indicate that this is a re-written data segment.

13. The tape drive of claim 9, wherein the second field is written to a specific code to indicate when a data segment is originally written to tape.

14. The tape drive of claim 9, wherein the second field is written to a specific code to indicate when a data segment is re-written to tape using a backwards compatible mode.

15. A tape drive, comprising:
    at least one tape read/write head, wherein the at least one read/write head is configured to write a plurality of data segments N onto a tape simultaneously;
    means for determining when one or more of the plurality of data segments written to the tape needs to be rewritten;
    means for accumulating data segments that need to be rewritten, wherein the accumulated data segments are written to tape when a N data segments have been accumulated, wherein each data segment rewritten to the tape has a first field in a header that designates itself and a second field in the header that designates a second re-written data segment.

* * * * *